G. M. GREEN.
DISH WASHER.
APPLICATION FILED JAN. 7, 1920.
1,394,169.
Patented Oct. 18, 1921.
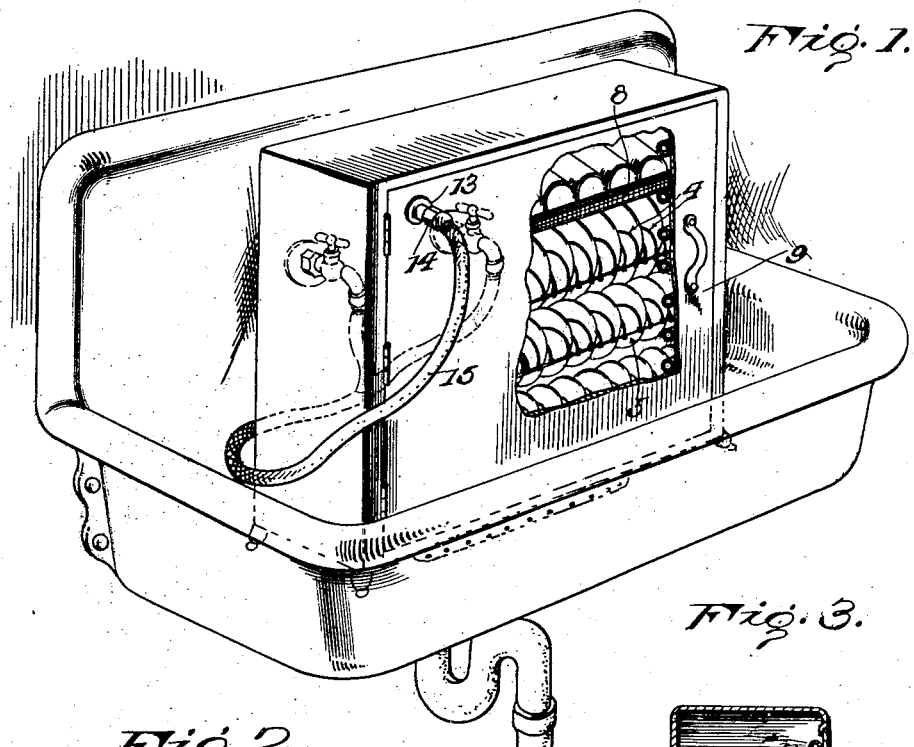
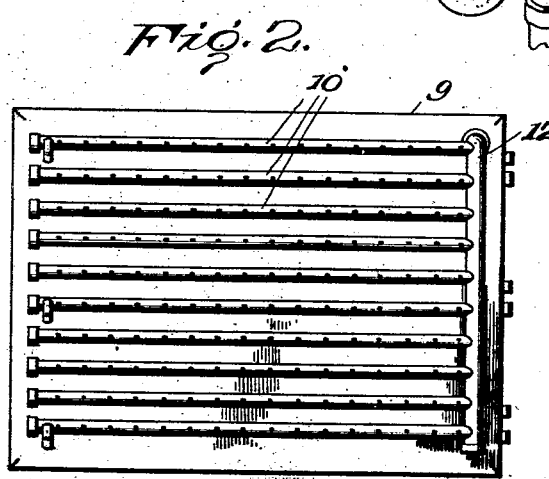
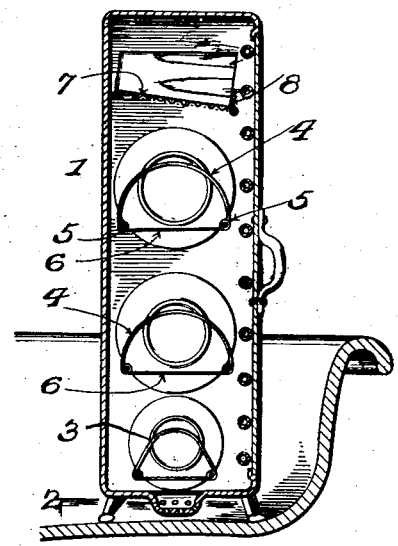
Inventor.
G. Marvin Green.

UNITED STATES PATENT OFFICE.

G. MARVIN GREEN, OF KISSIMMEE, FLORIDA.

DISH-WASHER.

1,394,169.  Specification of Letters Patent.  Patented Oct. 18, 1921.

Application filed January 7, 1920. Serial No. 349,902.

*To all whom it may concern:*

Be it known that I, G. MARVIN GREEN, of Kissimmee, in the county of Osceola and State of Florida, have invented certain new and useful Improvements in Dish-Washers; and I do hereby declare the following to be a full, clear, and exact description of the invention, such as will enable others skilled in the art to which it appertains to make and use the same.

My object is to provide a simple and inexpensive apparatus primarily adapted for household use and one which is portable and made of iron, aluminum, tin or any other appropriate material.

Figure 1 is a perspective showing the apparatus standing in a kitchen sink and attached to the faucets, ready for use.

Fig. 2 shows the interior face of the door, and

Fig. 3 is a horizontal sectional view showing the formation of the shelves.

The casing 1 is a portable domestic article adapted to be easily lifted and placed in a sink for use or stored away after using. It is shown formed with feet 2 which hold it elevated above the bottom of the sink to permit of draining through a bottom outlet.

I equip the casing interiorly with a series of shelves 3 to hold the plates, dishes and other table china or glass ware. As shown, the shelves are designed to hold plates in an upright position. For this purpose they consist of a series of vertically disposed wire rings 4 attached to rods 5 extending horizontally across the casing and secured to its end walls. The wires are wound around the rods to form transverse reinforcing members 6 and are of arch shape above the rods to form plate engaging portions. They may be moved lengthwise of the rods.

As appropriate means for holding cups and glasses I provide the casing with a forwardly slanting shelf 7 having an upward extending flange 8 at its front lower edge. The shelf is preferably made of quarter inch mesh wire screen. This construction holds the cups and glasses in proper position to receive the water from the spray pipes and yet allow of drainage.

The top, ends and rear side of the casing are imperforate, to prevent leakage. The front side is hinged to constitute a door 9. This door carries the spray pipes so that the line of direction of the cleansing water will be away from the door and toward the opposite imperforate side, top and end walls of the casing. As shown in Fig. 2 the door carries on its inner face a series of perforated spray pipes 10 leading from a header 12. An inlet pipe 13 enters this header from the exterior of the door where it is formed with a hose coupling 14. I provide a pliable tube 15 to be connected at one end with the interior of the casing by the coupling 14 and at its other end having a Y formation to be connected with the hot and cold water faucets of the sink, either by screws or slip-on couplings.

I claim as my invention:

A dish washer comprising a portable casing adapted to be placed in a sink and equipped with a drain outlet and a series of shelves, said casing having one of its sides hinged to constitute a door, a header and a series of perforated spray pipes on the inner face of said door, the remaining walls of said casing being imperforate, and a tube adapted to be connected with said header and a faucet of the sink.

In testimony whereof I have signed this specification.

G. MARVIN GREEN.